United States Patent [19]

Rizvi

[11] Patent Number: 4,543,735
[45] Date of Patent: Oct. 1, 1985

[54] METHOD AND APPARATUS FOR THE ACCELERATED ADJUSTMENT OF WATER ACTIVITY OF FOODS AND OTHER MATERIALS

[75] Inventor: Syed S. H. Rizvi, Ithaca, N.Y.
[73] Assignee: Cornell Research Foundation, Inc., Ithaca, N.Y.
[21] Appl. No.: 496,542
[22] Filed: May 20, 1983
[51] Int. Cl.[4] .............................................. F26B 5/04
[52] U.S. Cl. ........................................... 34/15; 34/32
[58] Field of Search ................ 34/15, 32, 92; 99/472; 73/73, 74, 76

[56] References Cited

U.S. PATENT DOCUMENTS

| | | | |
|---|---|---|---|
| 2,575,169 | 11/1950 | Green | 73/73 |
| 2,692,497 | 10/1954 | Van Nordstrand | 73/19 |
| 3,145,562 | 8/1964 | Hamilton et al. | 73/76 |
| 3,557,467 | 1/1971 | Dietert | 34/15 |
| 3,813,918 | 6/1974 | Moe | 73/76 |
| 3,916,670 | 11/1975 | Davis et al. | 73/76 |
| 4,199,916 | 4/1980 | Shishoo | 34/12 |
| 4,212,194 | 7/1980 | Allen et al. | 73/73 |
| 4,215,568 | 8/1980 | Garber et al. | 73/73 |
| 4,227,399 | 10/1980 | Groninger | 73/73 |
| 4,326,341 | 4/1982 | Anderson | 34/15 |

OTHER PUBLICATIONS

"An Automated Adsorption Isotherm Device", Wilkinson, Allan et al., Biophysical Journal, vol. 16, No. 3, (Mar. 1976), pp. 193-197.

Primary Examiner—Larry I. Schwartz
Assistant Examiner—David W. Westphal
Attorney, Agent, or Firm—Dressler, Goldsmith, Shore, Sutker & Milnamow, Ltd.

[57] ABSTRACT

Disclosed herein is an accelerated method of achieving a desired moisture content or water activity in a standard sample of biomaterial comprising the steps of (a) placing the sample in the headspace of an equilibration chamber; (b) establishing in the headspace an atmosphere of 100% or approximately 0% relative humidity; (c) exposing the sample in the headspace to the atmosphere for a predetermined length of time to achieve the desired moisture content or water activity, this length of time having been predetermined by the use of a previously prepared curve which has been prepared using corresponding samples under the same conditions in the same equilibration chamber; and (d) removing the sample from the chamber at the conclusion of the predetermined length of time when the sample has not reached an equilibrium with the humidity in the atmosphere in the chamber. Apparatus for practicing the method is also disclosed.

3 Claims, 2 Drawing Figures

METHOD AND APPARATUS FOR THE ACCELERATED ADJUSTMENT OF WATER ACTIVITY OF FOODS AND OTHER MATERIALS

TECHNICAL FIELD

This invention relates to monitoring changes in foods and other biomaterials to adjust the moisture content or water activity in test samples thereof, thereby to assist in determining the optimum water activity which provides extended shelf life.

BACKGROUND OF THE INVENTION

Preservation of foods and biomaterials by drying is an ancient method still in practice on a large scale. However, it has been only recently recognized that it is not the absolute quantity of water but a combination of the state and amount of water available for microbial and biochemical reactions which determines the nature and extent of spoilage. The availability of water in a system is expressed by its sorption isotherm which is a plot of the amount of water as a function of the relative humidity or activity of water vapor of an atmosphere in equilibrium with the system at a specified temperature. Thus, it is the water activity ($A_w$), a measure of the available water in a biomaterial, which controls deteriorative reactions.

To achieve extended shelf life for dried foods, it is necessary to determine for each type of material the water activity value at which the least deteriorative reactions occur. This determination requires many experimental studies wherein it is necessary to maintain samples of the materials at a specific water activity value. Although there are three basic methods of obtaining complete sorption isotherms, the gravimetric method is preferred by most investigators for adjustment of water activity of samples to a specified value. In this method test samples are allowed to equilibrate to a preselected water vapor pressure in the headspace around the sample in a sealed equilibration chamber maintained at constant temperature. Theoretically, at equilibrium the water activity of the sample is determined by the relative humidity of its surrounding which in time become the same. However, a true equilibrium is never attained since that would require an infinitely long period of time and the equilibrium process is terminated when the difference between successive weights of the sample becomes less than the sensitivity of the balance used. While various techniques have been suggested to accelerate this approach to equilibrium, depending upon the type of material and the degree of accuracy required, it could still take anywhere from a few days to weeks or even months to achieve the desired result. Unfortunately, the long time required to attain the desired water activity can alter the physicochemical and microbiological nature of the sample under study. In certain cases deteriorative reactions may proceed to such an extent as to render the quality of test materials far remoted from their initial levels, thus confusing the results.

When reference is made to the relative humidity of the sample, it will be understood that this is done in accordance with conventional nomenclature in which equilibrium relative humidity (ERH) is defined as 100 times the ratio of the vapor pressure in the sample to the saturated water vapor pressure of pure water at the same temperature. The value so obtained is numerically equal to the water activity of the sample expressed as a percentage.

Equilibrium relative humidity of a sample with that of its surrounding is reached by adsorption or desorption of water vapor between the sample and its surrounding atmosphere. The adsorption or desorption of water vapor is a mass transport phenomenon driven by the water activity gradient between the test material and its surrounding. When the water activity of the sample is higher than that of the surrounding, moisture will desorb from it and will go into the surrounding, and vice versa, until an equilibrium is established. As the sorption process proceeds, the driving force continually diminishes and the rate of sorption slows. This process can continue for an infinitely long period of time before true equilibrium is reached.

The need is clear, therefore, for a new, simple and accelerated method of achieving the desired water activity of a sample of biomaterial for comparative research purposes.

BRIEF SUMMARY OF THE INVENTION

The invention is an accelerated method of achieving a desired moisture content or water activity in a standard sample of biomaterial comprising the steps of (a) placing the sample in the headspace of an equilibration chamber; (b) establishing in the headspace an atmosphere of 100% or approximately 0% relative humidity; (c) exposing the sample in the headspace to the atmosphere for a predetermined length of time to achieve the desired moisture content or water activity, this length of time having been predetermined by the use of a previously prepared curve which has been prepared using corresponding samples under the same conditions in the same equilibration chamber; and (d) removing the sample from the chamber at the conclusion of the predetermined length of time when the sample has not reached an equilibrium with the humidity in the atmosphere in the chamber.

DETAILED DESCRIPTION OF THE INVENTION

Figure 1:
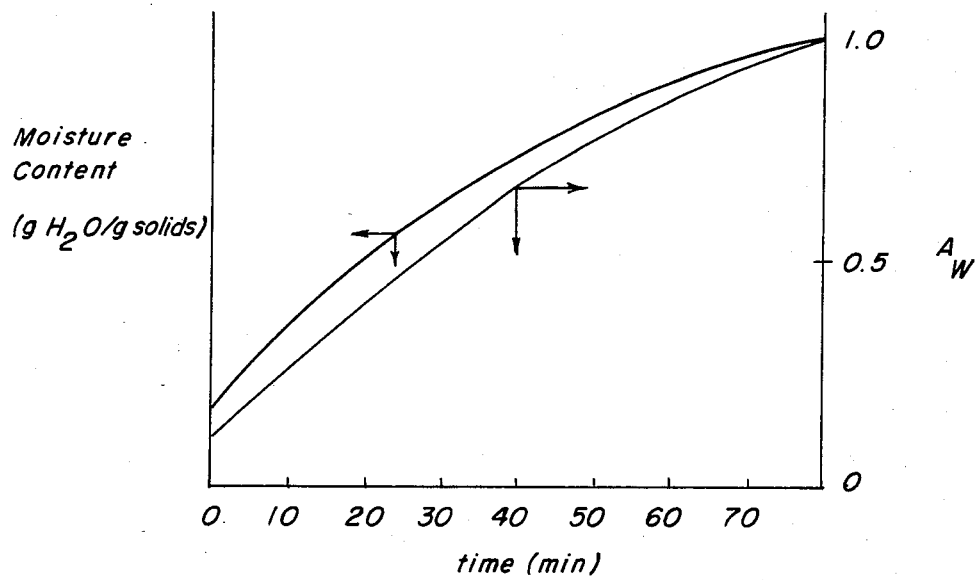
FIG. 1 illustrates a standard curve for the adsorption process.

In accordance with this invention, there is provided an accelerated method of achieving a desired moisture content or water activity in a standard sample of food or other biomaterial by increasing the driving force between the relative humidity of the atmosphere within an equilibration chamber and that of the sample to be treated. The rate of moisture pickup or loss by test samples is accelerated by increasing this driving force and maintaining it at higher values until the desired change in sample moisture content and, therefore, water activity is obtained.

This is accomplished by (a) placing the sample in the headspace of an equilibration chamber; (b) establishing in that headspace an atmosphere of 100% or approximately 0% relative humidity; (c) exposing the sample in the headspace to the selected atmosphere in the headspace for a predetermined length of time to achieve the desired moisture content or water activity, this length of time having been predetermined by the use of a previously prepared curve prepared using corresponding samples under the same conditions in the same equilibration chamber; and (d) removing the sample from the chamber at the conclusion of the predetermined length of time when the sample has not reached an equilibrium with the humidity in the atmosphere in the chamber.

The atmosphere in the headspace of the chamber may be maintained at 100% relative humidity with the aid of saturated water vapors in the headspace for adsorption studies or at approximately 0% relative humidity by using desiccants for desorption studies. The sorption rate can be further accelerated by drawing a vacuum in the equilibration chamber to remove interstitial air which acts as a barrier to water vapor sorption, and by providing agitation to the headspace as well as to the relative humidity source (water or desiccant). Placing the sample on a fine mesh (400) wire screen within the chamber also helps speed the sorption process by allowing the process to occur on all surfaces of the sample.

The test sample is exposed to the atmosphere in the headspace of a sealed equilibration chamber for a predetermined length of time to achieve the desired water activity. This length of time is determined from a standard moisture content/water activity versus time curve which has been previously prepared using corresponding samples under the same conditions in the same equilibration chamber. Identical samples of the same material and of the same moisture content are exposed to the equilibration chamber atmosphere for preselected, fixed intervals of time. The chamber may contain either water or desiccant as a humidity source. A vacuum may be drawn in the chamber and agitation may be used. The curves and the subsequent treatment of a standard sample are all made under identical conditions. At the end of each time interval, the samples used to form the curve are weighed for gain (adsorption) or loss (desorption) in weight and the new moisture content is computed. At the end of each exposure period, a portion of the sample may be used to determine its water activity by either a hygrometer or a manometer. From the data thus obtained, a standard plot or curve of the adsorption/desorption process under the conditions discussed is prepared.

This invention includes apparatus for establishing a desired water activity in a standard sample of biomaterial. The apparatus includes an equilibration chamber having a sample support therein, a wire extending through an opening in the top of the chamber, this wire being connected to the specimen support, means to releasably seal the opening in the top of the chamber, a balance mounted above the equilibration chamber, a second wire extending downwardly from the balance, and means removably connecting the free ends of the wires outside of the chamber, the specimen support being unconnected to the equilibration chamber so that the sample support and the sample thereon can be weighed by the balance.

FIG. 1 illustrates such a standard curve for the adsorption process. It will be seen from this figure that if it is desired to produce a sample having a water activity of 0.5 reached by adsorption, one must merely check the graph and, using precisely the same conditions in the equilibration chamber as were used when the curve was prepared, and knowing the initial water activity of the material, determine the length of time the sample must remain in the chamber to achieve the desired 0.5 water activity. When the sample is removed from the chamber at the conclusion of this predetermined length of time, it will not have reached an equilibrium with the humidity in the atmosphere in the chamber.

The desired atmosphere within the chamber is achieved by placing in the lower portion thereof either a pool of water if 100% relative humidity is desired, or a desiccant, such as calcium sulfate, if 0% relative humidity is desired.

Figure 2:
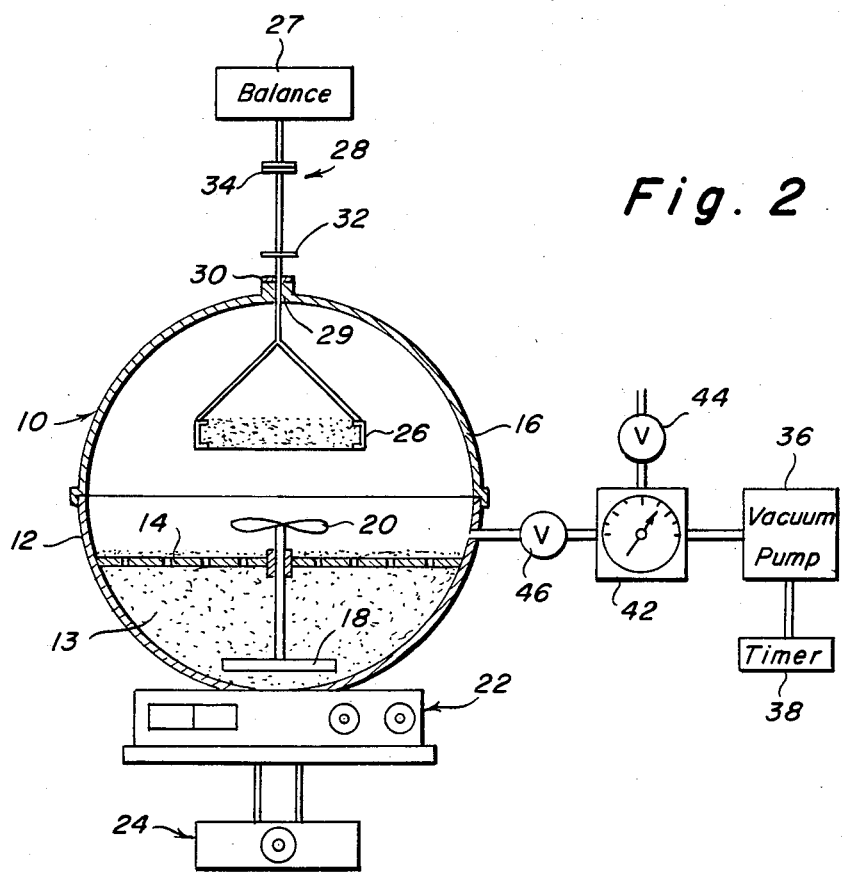
FIG. 2 is the apparatus used in practicing the method of this invention.

Referring now to FIG. 2, the apparatus used in practicing the method of this invention includes an equilibration chamber 10, such as a Nalgene desiccator, having a lower portion 12 in which is placed the relative humidity source (water or desiccant). The chamber is fitted with a fan 20, preferably driven by a magnetic stirrer 18 hanging from the bottom of the fan shaft. This assembly is supported within the chamber by a perforated porcelain desiccator plate 14, such as a 230 mm diameter plate by Coors. The desiccator plate divides the lower portion 12 of chamber 10 from the headspace 16, but permits free exchange of water vapor between the two portions. The chamber 10 is placed on a magnetic stirring plate 22 which drives the magnetic stirrer 18 and fan 20. The stirring plate, in turn, is preferably supported by a variable jack 24, the purpose of which will be explained below.

Within the headspace 16 of the chamber 10 is suspended the sample support 26 which preferably has a mesh screen on the bottom thereof to support the sample. The sample support 26 is suspended from an analytical balance 27 (Mettler P163) or other weighing device, by means of wire 28 which passes through a hole 29 in the top of the chamber. A sealing gasket 30 surrounds hole 29 and a sealing disc 32 is arranged on wire 28 to seal the chamber when lowered onto gasket 30. For ease in handling the apparatus, support wire 28 is formed in two pieces which are removably connected to one another outside the chamber. This is preferably accomplished by having each piece connected to one of a pair of magnets 34. When it is desired to disconnect the sample support 26 from balance 27, it is only necessary to lower the chamber 10 by means of variable jack 24 until the magnets are separated. When the chamber is raised, the magnets can be reconnected.

Chamber 10 is connected to vacuum pump 36 which may be controlled by a timer 38 to cut off the vacuum at the end of a predetermined time period. The normal pressure gauge 42 and control valves 44 and 46 are placed between chamber 10 and vacuum pump 36. Sealing gasket 30 and sealing disc 32 ensure a tight seal when a vacuum is drawn within the chamber. In practicing the method of the invention, a vacuum level of 10" Hg to 28" Hg may be used, and a 24" Hg vacuum level is preferred.

Other mechanisms may be used for weighing the samples and creating a vacuum within the equilibration chamber. In addition, the entire apparatus may be automated by means of an appropriate computerized control.

What is claimed is:

1. An accelerated method of achieving a desired moisture content or water activity in a standard sample of biomaterial by increasing the difference between the relative humidity of the atmosphere within the headspace of a sealed equilibration chamber and that of the sample whose moisture content or water activity is to be adjusted comprising the steps of:
   (a) determining the initial water activity and the desired water activity of said sample and determining therefrom whether the sample is to be dehumidified or humidified;

(b) placing said sample on a sample support in the headspace of said equilibration chamber;

(c) establishing and maintaining in said headspace an atmosphere of either 100% relative humidity if the sample is to be humidified or approximately 0% relative humidity if the sample is to be dehumidified;

(d) exposing said sample in said headspace to said atmosphere for a predetermined length of time to achieve said desired moisture content or water activity, said length of time having been predetermined by the use of a previously prepared standard moisture content/water activity versus time curve, said curve having been prepared using corresponding samples under the same conditions in the same equilibration chamber; and (e) removing said sample from said chamber at the conclusion of said predetermined length of time when said sample has not reached an equilibrium with the humidity in said atmosphere in said chamber.

2. The method recited in claim 1, further including the step of drawing a vacuum in said chamber after said sample has been placed therein to speed said sorption process.

3. The method recited in claim 1, further including establishing and maintaining in said headspace an atmosphere of either 100% or approximately 0% relative humidity, respectively, by providing either a pool of water or a mass of disiccant in said chamber below said sample support and agitating said water or said desiccant.

* * * * *